US010752502B2

(12) United States Patent
Santo et al.

(10) Patent No.: US 10,752,502 B2
(45) Date of Patent: Aug. 25, 2020

(54) "ENRICH-SMAX"—INTEGRATED H2S REMOVAL, SEPARATION OF IMPURITIES AND PARTIAL ACID GAS ENRICHMENT IN SOUR GAS PROCESSING (71) Applicants: Stephen L Santo, La Crescenta, CA (US); Mahin Rameshni, Monrovia, CA (US)

(72) Inventors: Stephen L Santo, La Crescenta, CA (US); Mahin Rameshni, Monrovia, CA (US)

( * ) Notice: Subject to any disclaimer, the term of this patent is extended or adjusted under 35 U.S.C. 154(b) by 178 days.

(21) Appl. No.: 16/052,610

(22) Filed: Aug. 2, 2018

(65) Prior Publication Data
US 2020/0039825 A1    Feb. 6, 2020

(51) Int. Cl.
*C01B 17/04* (2006.01)
*B01D 53/14* (2006.01)

(52) U.S. Cl.
CPC ...... *C01B 17/0417* (2013.01); *B01D 53/1406* (2013.01); *B01D 53/1418* (2013.01); *B01D 53/1425* (2013.01); *B01D 53/1462* (2013.01); *C01B 17/0456* (2013.01); *B01D 2252/204* (2013.01)

(58) Field of Classification Search
None
See application file for complete search history.

(56) References Cited

U.S. PATENT DOCUMENTS 9,339,756 B1 * 5/2016 Bela .................. B01D 53/1425

* cited by examiner

*Primary Examiner* — Anita Nassiri-Motlagh (57) ABSTRACT

This disclosure relates generally to processes sour gas treating for H2S Removal, separation of impurities such as hydrocarbons, BTEX and mercaptans and the Partial Acid Gas Enrichment integrated system from the sour gas field developments, or any application. The combination of innovation schemes comprises one or more absorbers, primary and secondary regenerators. The secondary regenerator functions are, enriching the H2S stream further and to separate the hydrocarbons, mercaptans and BTEX where an additional acid gas enrichment and hydrocarbons removal could be eliminated. Then there is a unique sulfur recovery and tail gas treating with a unique 2-zone reaction furnace, tail gas absorber which operated as partial acid gas enrichment by receiving split acid gas from the SRU and the hydrolysis reactor to hydrolyze sulfur compounds.
The acid gas from the primary and the secondary amine regeneration and the acid gas recycle from the tail gas which is preheated and these streams flow to the 2-zones reaction furnace in the sulfur recovery unit to establish a stable low emission and higher recovery.

19 Claims, 6 Drawing Sheets

"ENRICH-SMAX"—INTEGRATED H2S REMOVAL, SEPARATION OF IMPURITIES AND PARTIAL ACID GAS ENRICHMENT IN SOUR GAS PROCESSING

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING

Not Applicable

REFERENCE TO A TABLE

Not Applicable

REFERENCE TO A COMPUTER PROGRAM LISTING COMPACT DISK APPENDIX

Not Applicable

BACKGROUND OF THE INVENTION

This disclosure relates generally to processes sour gas treating for H2S Removal, separation of impurities such as hydrocarbons, BTEX and mercaptans and the Acid Gas Enrichment integrated system from the sour gas field developments, refineries, associated gas, shale gas, SYN GAS from power plants, natural gas processing applications, and early production facility more particularly to processes the mixture of the 100% lean H2S gas stream with impurities such as heavy hydrocarbons, mercaptans, benzene, toluene and Xylene (BTEX). The combination of innovation schemes comprises the H2S Removal and the Acid Gas Enrichment and separation of hydrocarbons from H2S to promote a cost effective options by reducing the number of units in an efficient manner and to achieve near 100% sulfur recovery with significant cost and energy saving. The separated hydrocarbon stream gas is sent to the first zone of the reaction furnace in the sulfur recovery where operates at a higher temperature to destruct the impurities or is sent to the quench system in the tail gas unit. The rich H2S acid gas is sent to the first or second zone of the reaction furnace in the sulfur recovery unit depending on the combustion temperature. With further aspects of the present invention, the innovation scheme is a combination of the main absorber(s) and the primary and the secondary regeneration unit. In summary, by adding the secondary regenerator to the acid gas removal unit with the unique scheme, a separate acid gas enrichment unit and a separate hydrocarbons removal unit could be eliminated and the H2S removal, hydrocarbons removal and acid gas enrichment is integrated in this unique invention. The tail gas absorber can operate as the H2S Enrichment Absorber and can operate at the higher H2S rich loading compare to typical tail gas absorber which ultimately lower amine solvent circulation can be used.

DESCRIPTION OF THE RELATED ART

Increasing energy costs and growing demand for natural gas have driven the development of sour gas fields around the world. About 40% of the world's natural gas reserves are in the form of sour gas where H2S and CO2 compositions exceed 10% volumetric of the raw produced acid gas. In some cases the acid gas composition in these reserves is very high and economics of producing pipe line quality gas are marginal. Natural gas almost always contains contaminates or other unacceptable components, including heavy hydrocarbons, mercaptans, mercury, water and the acid gases of H2S and CO2.

Conditioning natural gas for pipeline LNG or GTL, LPG and Condensate, marine fuels requires the removal of these undesirable contaminants.

Emissions regulations are getting tighter and there is increasing demand to achieve higher sulfur removal and recovery. To comply with both progressively tighter product purity specifications and stricter environmental regulations while at the same time handling feedstocks from more diverse and sometimes lower-grade sources, gas treatment plant operators in the hydrocarbon processing industries are having to adopt measures to deal specifically with minor impurities which would otherwise impair the efficiency of the main gas treatment unit or cause infractions of environmental emission standards.

These impurities include elemental sulfur, mercury, heavy hydrocarbons, ammonia, carbon sulphides and mercaptans, and sub-micron particulate solids such as ferrous sulphide. Traditionally, depending on their nature and the set-up of the processing plant, these impurities have been be dealt with by preliminary treatment upstream of the main gas processing unit or by final conditioning of the treated gas.

In accordance to the new invention, the full stream of the acid gases flow to one or multiple absorber(s) in the acid gas removal unit. The rich solvent from the bottom of the absorber(s) flows to the secondary regeneration unit through the solvent flash drum. A portion of the acid gas stream from the primary regeneration overhead upstream of the regeneration overhead condenser flows to the secondary regeneration. A cooled lean solvent also flow to the secondary regeneration unit, where hot gas is in contact with cooled solvent and most of hydrocarbons will be separated and flows through the secondary regeneration overhead. The rich solvent from the bottom of the secondary regeneration is heated and flows to the primary regeneration.

The secondary regenerator receive 3 feed stream to process, and performs 2 functions, first to enrich the acid gas further to eliminate a separate acid gas enrichment, second to separate the hydrocarbons where the hydrocarbons could be fully destructed in the sulfur recovery unit preventing soot formation and catalyst deactivation or could be processed in the quench system in the tail gas unit to recover the hydrocarbon and to use it as a fuel in the tail gas incineration which the overall facility have less CO2 emission to support greenhouse gases. In addition since the sulfur recovery will receive richer H2S stream, increase the sulfur recovery, and improve the performance of the unit.

The solvent is generic or formulated commercial solvent is known for the acid gas removal in acid gas removal processing units. The solvent could chemical, physical or hybrid solvent, it is also known as amine solvent.

Regenerating Alkanolamines Desulfurizer solutions, U.S. Pat. No. 4,299,801, November 1981, by James Lynn is a method of regenerating spent Alkanolamines in a 2-stage desorption where each stage uses steam to strip the gas where stage one would not receive any gas from stage 2 and stage 1 would not receive any recovered lean solvent from stage 2 and no hydrocarbons is recovered and H2S is not enriched.

U.S. Pat. No. 3,752,877, August 1973, Recovery of sulfur compounds from tail gases, by David Beavon is a method sulfur removal in the tail gas treating system, where the tail gas absorber would not receive any acid gas split from the sulfur recovery unit, in other words the tail gas absorber would not operate as the partial acid gas enrichment absorber. In addition, there is no hydrolysis reactor after the hydrogenation reactor in the BSR process while the new unique invention consists of hydrolysis reactor and the partial acid gas enrichment tail gas absorber. Finally, the new invention consists of special feature using the educator to prevent emission of H2S to the stack during the startup instead the gas is circulated through the unit during the startup to prevent the emission violation during the startup.

The SCOT tail gas process by Shell Claus off-gas treating and advanced ULTRA SCOT is similar to BSR process where there is no hydrolysis reactor, and there is no partial acid gas enrichment tail gas absorber and there is no acid gas split flow from the sulfur recovery flows to the absorber.

In accordance to the new invention, the secondary regeneration processes 3 streams, it receives a portion of the acid gas stream from the primary regeneration overhead before it gets cool off in the overhead condenser, it receives a slip stream of the regenerated lean solvent and also receives the rich solvent from the absorber(s) through the flash drum.

The secondary regeneration enriches the H2S concentration and separates the hydrocarbons from the rich stream of the primary regenerator.

The secondary regeneration overhead can flow to the quench system in the tail gas unit to recover the hydrocarbon. If hydrocarbon is not recovered the acid gas from the primary regeneration overhead flows to the sulfur recovery unit and hydrocarbons will be destructed as impurities and wasted where if it is recovered could be used as fuel gas to save energy.

The new invention will enhance the performance of the sulfur recovery unit by providing higher H2S concentration to the reaction furnace to achieve higher combustion temperature, and by separating hydrocarbons and mercaptans which cause soot formation, catalyst deactivation in the sulfur plant. In number of gas processing plants activated carbon beds are added to separate the hydrocarbons upstream of the sulfur recovery units to reduce soot formation, and catalyst deactivation and to improve the overall recovery of the sulfur plant.

The new invention in the sulfur recovery unit, the reaction furnace consists of 2-zone to process amine acid gas, and the recycles from the regenerator of the tail gas unit or from other regenerator, and from the sulfur pit vent and from sulfur storages. While the current 2-zone reaction furnace like AMOCO, BSR, ARCO, SHELL and Jacobs design is that to process ammonia acid gas and the TGU recycle and most of amine acid gas in the first zone and the remaining of the same amine acid gas stream to the second zone without using any repeater and it is for the refinery applications where the sour water stripper gas has to be processed in the sulfur recovery. While in this invention, there is no sour water stripper gas because the invention is related to the sour gas field developments and the gas plants. In addition, the same feed stream is not split within 2-zones, instead different feed stream flows to each zone.

The enhancements sought will improve economics, improve sulfur plant efficiency, by recovering the hydrocarbons and mercaptans improve process environmental performance (including carbon emission reduction), and increase process reliability. At least 2 additional units; acid gas enrichment and hydrocarbon removal could be eliminated.

With further aspects of the present innovation, if the overhead of the secondary regeneration flows to the sulfur recovery, then this stream flows to the first zone of the reaction furnace due to impurities, and higher combustion temperature and the overhead from the primary regeneration flows to the second zone of the reaction furnace which is hydrocarbon free stream.

This application for patent discloses integrated processes for desulfurization of gas streams in the sour gas field developments, SYN gas from power plants, refineries, associated gas, early production facility and or any application that the sour gas is lean in H2S and requires enrichment upstream of the sulfur recovery unit where the H2S removal unit separation of hydrocarbons, and the acid gas enrichment are integrated in one unit.

This application for patent discloses integrated processes for desulfurization of gas streams in the sour gas field developments, refineries, SYN gas from power plants, associated gas, early production facility and or any application that the sour gas is lean in H2S and contains impurities as hydrocarbons, mercaptans, and BTEX and requires other polishing unit to remove impurities, and also requires acid gas enrichment upstream of the sulfur recovery unit where the H2S removal unit and the acid gas enrichment are integrated in one unit.

The H2S removal unit solvent could be commercial generic or formulated solvent in a form of chemical, physical or hybrid solvent or the mixture of these solvents.

With further aspects of the present innovation, a portion of the acid gas containing H2S flows to the sulfur recovery unit can be further enriched using the tail gas absorber as the partial enrichment absorber.

In the Conventional Acid Gas Enrichment the Acid gas amine type enrichment unit upstream of SRU or with common regeneration unit with the TGU/amine unit will consist of a common acid gas pretreatment step with selective solvent based MDEA formulated solvent, and a three stage Claus units followed by a common tail gas/amine tail gas treating unit, to enrich the gas to the SRU and to reduce the SRU equipment. The acid gas enrichment works very well where the H2S concentration are very low, for this project, the H2S concentration for high H2S cases varies from 46% to 68% and the CO2 concentration varies from 43% to 21%, corresponding from H2S varies between (31-68)% and CO2 varies between (58-21)% in typical gas plants.

The conventional Acid gas enrichment is very effective where the H2S/CO2 ratio is low and will achieve high CO2 slip. The H2S is enriched and SRU unit will be smaller. In this project, we had high H2S/CO2 ratio and CO2 slip will decline therefore, the SRU will not be smaller and the acid gas enrichment are not very effective. In other words, after a detailed evaluation, we concluded that adding conventional acid gas enrichment would be not as effective as generally expected.

In the "ENRICH-SMAX" invention a unique proprietary scheme of the reaction furnace is employed as a 2-zone reaction furnace, where the combustion temperature is always higher in the first zone than the second zone and the design of 2-zone reaction furnace is different with the conventional scheme, and includes high intensity burner. In the conventional scheme of the 2-zone reaction furnace, hydrocarbons and mercaptans will be bypassed to the second zone since the combustion temperature would not be adequate for the heavy impurities destruction, which will cause soot formation and catalyst deactivation while in this invention the hydrocarbons and mercaptans are removed before entering the second zone of the reaction furnace and soot formation and catalyst deactivation is prevented.

BRIEF SUMMARY OF THE INVENTION

The present invention "ENRICH-SMAX" relates to an integrated process for H2S removal, separation of hydrocarbons, mercaptans, and acid gas enrichment from the sour gas field developments, associated gas, natural gas processing, SYN gas from power plants, refineries, early production facility, or any lean H2S stream containing hydrocarbons and mercaptans that requires separation of hydrocarbon and acid gas enrichment prior entering the sulfur recovery unit. The unique tail gas treating unit is also can be designed where the tail gas absorber operates as the partial acid gas enrichment absorber by processing an additional split gas stream to the sulfur recovery unit. In addition the hydrolysis reactor is added after the hydrogenation reactor to hydrolyze the sulfur compounds such as COS and CS2 where left the hydrogenation reactor and have impact on the stack emission.

The integrated process comprises one or more absorbers, primary regeneration and the secondary regeneration and the flash drum. Other equipment such as pumps, heat exchangers and filters are used and they are commonly used in aid gas removal unit.

In accordance to the new invention, the rich solvent from the bottom of absorber(s) flows to the secondary regeneration through the flash drum. A slip stream of lean solvent flows to the primary regeneration and the remaining flows to the absorber(s).

In accordance with aspects of the present invention, the process comprises 2 regeneration systems. The primary regeneration is equipped with the reboiler and the overhead condenser and the secondary regeneration is equipped with the overhead condenser only.

In accordance with further aspects of the present invention, a slip acid gas stream from the overhead of the primary regeneration flows to the secondary regeneration and the remaining of the acid gas from the primary regeneration flows to the primary overhead condenser, and then the acid gas flows to the sulfur recovery unit.

In accordance with one embodiment addition of the present invention, the rich solvent from the flash drum is cooled indirectly with cooling water or any type of cooler before entering the secondary regeneration to improve the hydrocarbons and mercaptan separation.

The secondary regeneration receives three streams, a slip stream of lean solvent, and a slip hot acid gas stream overhead and cooled rich solvent. The function of this tower is to remove H2S and hydrocarbons and mercaptans from these streams and flow to the overhead and the liquid is leaving from the bottom as the rich solvent is hydrocarbons free and contains less H2S.

In accordance with embodiment of the present invention, the acid gas from the secondary regeneration contains the hydrocarbons, mercaptans and H2S flows to the first zone of the reaction furnace in the sulfur recovery unit where the combustion temperature is higher than the second zone and has adequate temperature to destruct the hydrocarbons. While the acid gas from the primary regeneration flows to the second zone of the reaction furnace where the combustion temperature is lower but it is free of hydrocarbon and therefore, the soot formation and catalyst deactivation is eliminated as the results of 2-regeneration systems. In the conventional sulfur plant the acid gas from the H2S removal comes from one regenerator and for lean gas application if the acid gas split between 2 zones of the reaction furnace, cause soot formation and deactivate the Claus Catalyst and also reduce the overall sulfur recovery.

In further accordance with aspects of the present disclosure, the acid gas overhead from the secondary regeneration could flow to the quench system in the tail gas treating system instead of sulfur recovery unit where the hydrocarbons could be recovered and to be used as the fuel.

In further accordance with the present disclosure, the H2S removal solvent could be generic or formulated selective solvent in a form of chemical, physical or hybrid or combination of them. The chemical solvent is where there is an absorption and adsorption between H2S and the solvent. MDEA, MEA, DEA, DGA are commercially known as the generic solvent, Ucarsol, Selexol, 800 series by Dow, Flexsorb SE by ExxonMobil, Sulfinol by Shell, MS by Huntsman or similar are commercially known as the formulated selective solvent.

In accordance with another embodiment of the present invention, the rich solvent from the bottom of absorber(s) flows to the flash drum, where if the rich solvent comprises of high hydrocarbon contents, the rich solvent could be heated up in any type of the heat exchanger before entering the flash drum.

In accordance with further aspects of the present invention, The acid gas from the amine unit to the sulfur recovery is split where up to 75% of the amine gas entered the first zone of the reaction furnace and up to 25% of the acid gas is routed to the tail gas absorber in addition to the quench overhead stream that normally flows to the tail gas absorber, basically the tail gas absorber receives 2 streams. The tail gas amine unit is designed with the much higher amine loading similar to the amine unit, so in Summary:(1) 25% of the amine acid gas is sent to the tail gas absorber, (2) 75% of the amine acid gas is sent to the FIRST ZONE OF THE REACTION FURNACE, (3) The tail gas absorber operates at higher rich H2S loading (0.2-0.3 mol/mol), (4) The tail gas recycle from the tail gas regeneration unit is recycled to the SRU but not to the first zone, instead: The acid gas from the tail gas regeneration column, which is hydrocarbon/mercaptan free, is recycled back to the SRU. It is preheated and flows to the second zone of the reaction furnace. The combusted gas from the zone 1 reaction furnace flows to the second zone through choke ring where the temperature is above ignition temperature, and burn the acid gas in the second zone and the combusted temperature leaving the reaction furnace is 990 C. (5) The tail gas absorber can be designed with 0.2 to 0.3 mol/mol of rich H2s loading. (6) The acid gas loading in the tail gas absorber is normally 0.1 mol/mol maximum, and the acid gas loading for the amine absorber is normally 0.3 mol/mol, it means there is significant free amine in the tail gas absorber to process the portion of the acid gas. The tail gas absorber acts not only as a tail gas absorber but also as an enriched absorber without adding significant cost to the project. This scheme also removes the hydrocarbons/mercaptans, which cause problems in the second zone of the reaction furnace. As H2S concentration increases the 25% slipstream from the SRU feed to the tail gas absorber may be reduced as long as 1100 C-1150° C. combustion temperature in the first zone of the reaction furnace is achieved.

The partial acid gas enrichment "AG-Rich S-MAX" shows significant improvement of the sulfur recovery unit as well as reduction cost compare to conventional tail gas treating design with the proprietary design of the reaction furnace where the acid gas is recycled from the tail unit is preheated before entering the second zone of the reaction furnace. It is important to point out the first reactor contains at least Titanium catalyst to improve the hydrolysis of COS and CS2 due to high CO2 content and to improve the overall sulfur recovery.

In accordance with another embodiment of the present invention, the heat exchangers, fired heaters, steam repeaters, reboiler, condensers, lean-rich exchanger, filters are the type are commonly used in acid gas removal and sulfur recovery, tail gas treating applications.

In accordance with another embodiment of the present invention, the catalyst type are Claus catalysts, consisting of alumina, or titanium, Co/Mo (cobalt-molybdenum) or combinations. The converters in the Claus conversion step of this present process disclosure, employ one or more Claus catalysts including alumina catalysts, activated alumina catalysts (such as S-100 SR catalysts), alumina/titanium catalysts, and/or titanium catalysts, or any other catalyst systems which are employed in the Claus process, the catalysts having a range of surface area, pore volume, shapes (e.g., star shaped, beads, or powders), and percent catalyst content (in non-limiting example, from about 50 wt. % to about 95 wt. % $Al_2O_3$, having a purity up to about 99+%), without any limitations. The Claus processes within converter and subsequent converters, such as converter may be carried out at conventional reaction temperatures, ranging from about 200° C. to about 1300° C., and more preferably from about 240° C. to about 600° C., as well as over temperature ranges between these ranges, including from about 210° C. to about 480° C., and from about 950° C. to about 1250° C., without limitation.

The 2-zone reaction furnace is equipped with Choke Ring, Checker Wall, Vector Wall or equivalent to work as the divider, to create turbulent velocity and to protect any radiation to the tube sheet of the waste heat boiler.

BRIEF DESCRIPTION OF THE DRAWINGS

The following 6 figures are part of the present disclosure and are included to further illustrate certain aspects of the present invention. Aspects of the invention may be understood by reference to one or more figures in combination with the detailed written description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or the scope of the inventive concepts or the appended claims in any manner. Rather, the figures and detailed written descriptions are provided to illustrate the inventive concepts to a person of ordinary skill in the art and enable such person to make and use the inventive concepts.

The number of Claus conversion steps employed, which may range from one stage to more than ten, sub dew point reactors, reactors with internal cooling depends on the particular application and the amount of sulfur recovery required or desired. In accordance with certain non-limiting aspects of the present disclosure, the number and placement of multiple converters/reactors, and the associated condenser systems, may be adjusted without affecting the overall thermal reduction process described herein.

The sulfur recovery operates with air, enriched air, up to 100% oxygen enrichment.

The invention process is followed by the tail gas incineration, as a forced draft, or natural draft, with or without heat recovery, thermal or catalytic incineration, with or without caustic scrubbing and with or without SETR adsorbent bed type process.

DETAILED DESCRIPTION OF THE INVENTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government related and other constraints, which vary by implementation and from time to time. While a developer's efforts might be complex and time-consuming, such efforts would be, nevertheless, a routine undertaking for those of ordinary skill the art having benefit of this disclosure.

In the discussion of the Figures, the same or similar numbers will be used throughout to refer to the same or similar components. Not all valves and the like necessary for the performance of the process have been shown in the interest of conciseness. Additionally, it will be recognized that alternative methods of temperature control, tower internals, and filtration, heating and cooling of the process streams are known to those of skill in the art, and may be employed in the processes of the present invention, without deviating from the disclosed inventions.

In accordance to this invention, the sour gas which can come from any number of suitable sources, including but not limited to the numerous gases emanating from gas field developments, gas processing, SYN gas from power plants, associated gas, refineries, natural gas processing.

The solvent in the acid gas removal or H2S removal unit could be generic or formulated solvent in a form of chemical, physical or hybrid or mixtures of them.

Any type of suitable reheater device or method may be employed, such as an indirect steam reheat, fired reheater or similar. Any type of suitable cooler device or method may be employed such as air cooler, water cooler or any state of the art heat exchanges are used in this service.

In accordance to this invention, wherein, the reboiler(s), the type of the reheater device is used or method may be employed, such as an indirect steam reheat, fluid media reheater, steam injection, or fired heater.

In accordance to this invention, wherein, the cooler or overhead condenser unit, the type of the cooler device is used or method may be employed, air cooler, shell and tube water cooler, plate and frame water cooler or with any cooler media or a chiller.

In accordance to this invention, wherein, the internals for the absorbers and the primary and secondary regenerators are commercial type trays, random packing or structure packing.

The absorbers and regenerations in the acid gas removal of this present process disclosure, employ one or more absorbers and regenerations including trays, random or structure packing which are employed in the absorber and regeneration tower.

In general terms, Applicant has created new processes of H2S removal or acid gas removal integrated design for the partial acid gas enrichment, hydrocarbons, mercaptans and BTEX removal by employing additional regeneration system to eliminate polishing units for such impurities which results reasonable economic costs and energy savings as well as complying with the environmental regulations.

The present invention "ENRICH-SMAX" relates to processes for recovering H2S from the gas field developments, gas processing, associated gas, natural gas processing, refineries, syngas in the power plants with innovation H2S removal and hydrocarbons, mercaptans separation and acid gas enrichment to separate the feed to 2-streams to the sulfur recovery unit. the stream from secondary regeneration containing hydrocarbons mercaptans and has richer H2S flows to the first zone of the reaction furnace and the stream from the primary regeneration and it is hydrocarbon free and contains leaner H2S flows to the second zone of the reaction furnace. The innovation integrated scheme enriches the acid gas, remove the H2S and generates 2-stream to the sulfur recovery unit.

Further to the present invention relates to processes the amine acid gas entering the sulfur recovery unit. The unique design of the 2-zone reaction furnace in the sulfur recovery, the split amine acid gas to the tail gas absorber which operates as the partial acid gas enrichment tail gas absorber, and having hydrolysis rector to hydrolyze the sulfur compounds to increase the sulfur recovery and to reduce the SO2 stack emission.

The advantages of the new invention is the stream containing the hydrocarbons, mercaptans and BTEX is destructed in the first zone where the combustion temperature is higher which eliminate the soot formation, and the catalyst deactivation and improve the sulfur recovery efficiency and increase the reliability of operation for lean gases. In addition it is cost saving for eliminating the acid gas enrichment, and hydrocarbon removal units. Another advantage of the new invention is the feed stream to the sulfur recovery unit is split compare to the conventional method even if acid gas enrichment unit employed as a separate unit the feed to the sulfur recovery remains as one stream.

In accordance with aspects of the present invention, it is an object of the present disclosure to have a flexibility of processing the acid gas from the second regeneration to the quench system in the tail gas unit where the hydrocarbon could be recovered in the tail gas absorber and to be used as a fuel in the incinerator.

A further object of the present disclosure is the provision of an efficient process for H2S removal in the acid gas processing and economically acceptable for, present day industrial operations. Another object is to provide such a process which can tolerate variances in operating conditions within a given range without major equipment adaptations. A further object is to provide a process which can be utilized in co-acting phases to provide, at acceptable economics, the capacity required in present-day industrial operations.

In absorption, the reactions proceed to the right exothermically and the equilibrium is favored by low temperatures and high acid gas partial pressures. The partial pressure is the total pressure multiplied by the mole (or volume) fraction of the acid gas component. The optimum temperature for the absorption is about 35° C. because the increasing viscosity of the solution will decrease the absorption efficiency at lower temperatures.

In regeneration, the reactions proceed to the left and are favored by high temperatures and low acid gas partial pressures. The maximum temperature for the regeneration is about 130° C. because the solvent will degrade at higher temperatures.

Figure 1:
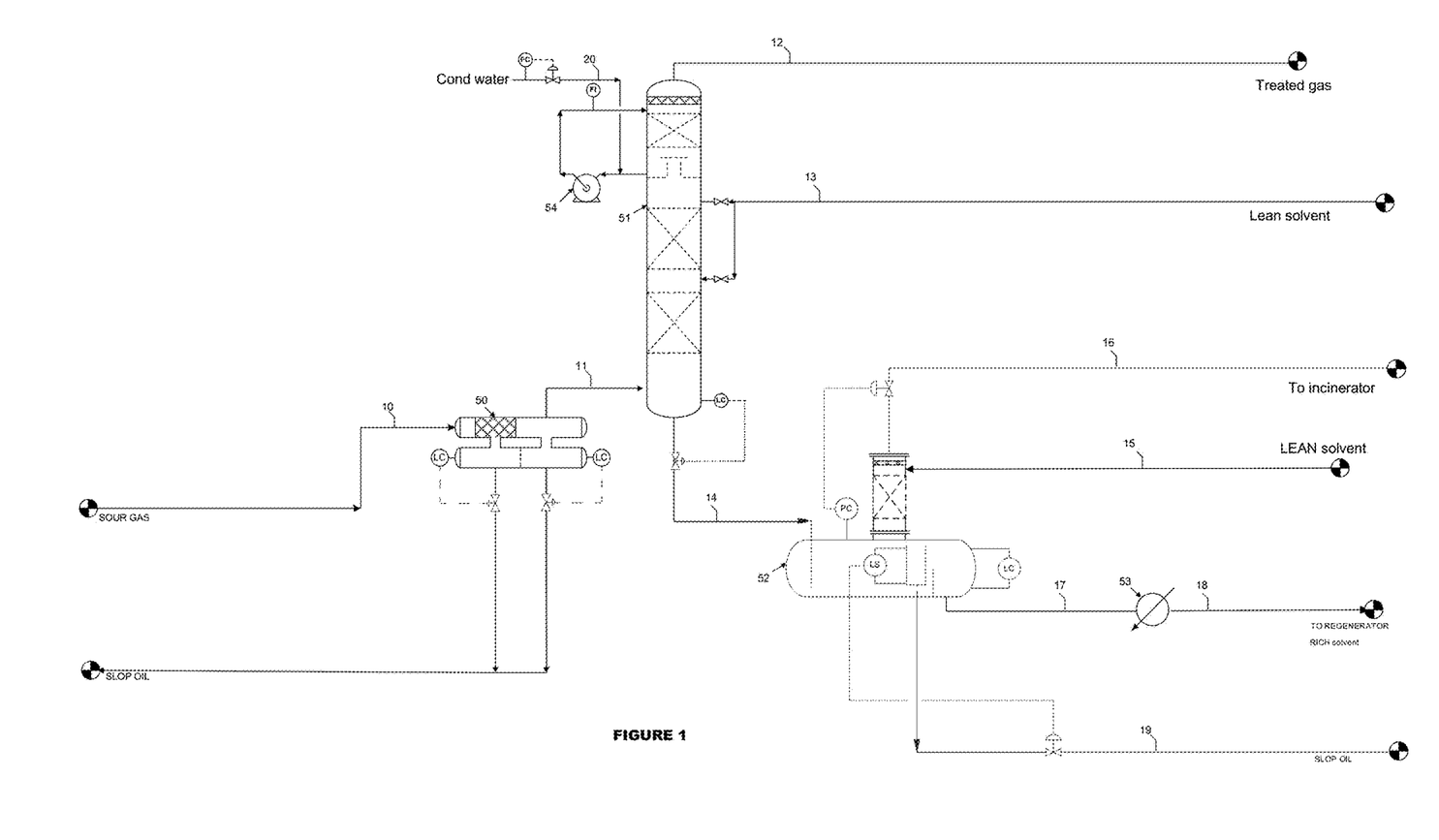
FIG. 1 illustrates a schematic diagram of an embodiment of the present disclosure, where the amine acid gas flows to the amine absorber through the filter and the rich amine solution flows to the flash drum which is equipped with the re-absorber on the top to remove the hydrocarbons.

Turning now to the figure, in FIG. 1, the sour gas stream (10) flows to the Gas Filter Separator (50) where it separate the water or oil from the sour gas, the sour gas stream (11) after filtration is sent to absorber(s) (51). The absorbers are designed with tray or random or structure packing, and operate in a range of 1 bar to 5000 bar. The lean solvent stream (13) is used counter current to the sour gas stream (11) and the overhead of the absorbers is sent to the treated gas header. Whereas the rich solvent stream (14) flows from bottom of the absorber to the Rich solvent Flash Drum (52).

The H2S removal unit contains one or more absorbers to treat the sour gas. The sour gas enters the H2S removal unit where it is sent to the absorber. The absorber is a packed or trays column that strips the H2S and CO2 from the gas to ensure that the treated gas meets the specifications. The lean solvent enters the absorber on flow control where it contacts the sour gas counter currently.

The rich solvent drum is a horizontal vessel and equipped with a scrubber on the top contains packing to strip the hydrocarbons by using lean solvent to contact the flash gas that coming from the solvent flash drum (52) and sends it to the incinerator as stream (16).

The rich solvent, which contains high levels of H2S and CO2, is sent to a flash drum where the hydrocarbons are removed from the reduction in pressure. Some H2S and CO2 are also removed in the flash drum. To minimize the fuel usage in the sulfur recovery unit the flash gas, containing primarily hydrocarbons, is used to fuel the incinerator (16). The rich solvent flash drum (52) is designed for at least 30-minute residence time so that the dissolved light hydrocarbons can gravity-separate from the bulk solution. The drum is equipped with baffles and weirs, designed to periodically skim off the hydrocarbon layer.

If the absorber operating pressure is high, the energy could be recovered by adding a turbine not shown in the figure on the rich solvent stream (14).

The rich solvent is on flow control reset by the level in the flash drum. The rich solvent stream (17) is then cooled as stream (18) in a cooler (53) before entering the secondary regenerator to improve hydrocarbons separation.

In order to prevent solvent losses on the absorber overhead, the gas stream inside of the absorber is washed with the condensate water stream (20) where is recycled through the recycle pump (54) to the top of the absorber, the wash section in the absorber (51) consists of 2-4 trays or equivalent packing.

Figure 2:
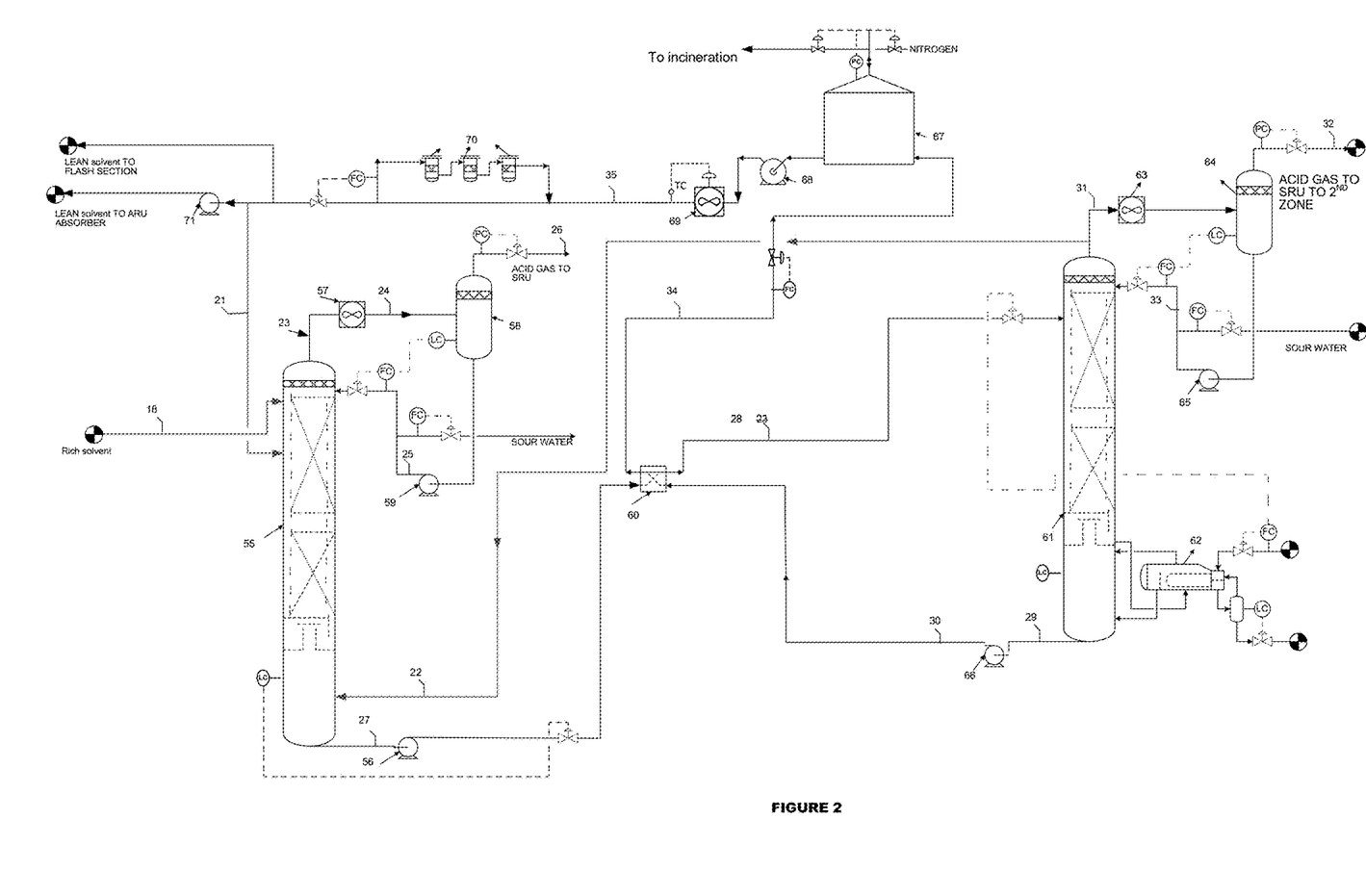
FIG. 2 illustrates a schematic diagram of an embodiment of the present disclosure, where the secondary regeneration unit is added to the acid gas removal to enhance the hydrocarbon removal and improve acid gas enrichment where the acid gas to the sulfur recovery unit is divided into 2 streams where only one contains hydrocarbons and mercaptans.

Turning to FIG. 2; the secondary regenerator (55) is the unique configuration of this invention. It is a packed or trays tower which is equipped with the condenser overhead (57) without any reboiler or steam injection. The secondary regenerator receives 3 feed streams. The first stream is the rich solvent from the rich flash drum through a cooler stream (18). The second stream is the cooled lean solvent from the primary regenerator stream (21). The third stream is the portion of the overhead gas from the primary regenerator before flows to the primary overhead condenser stream (22).

As described herein, the secondary regenerator (55) performs 2 functions. First is to enrich the acid gas further where it comes from the primary regenerator (61) and second to separate the hydrocarbons, mercaptan, BTEX. The gas is coming from the primary regenerator overhead stream (22) is hot, in order to improve the hydrocarbon separation the rich solvent is cooled before entering the secondary regenerator (55).

Before exiting the secondary regeneration column, the stripped gases may pass through the wash section consists of packing or trays where any entrained solvent solution is washed out with reflux stream (25) from the reflux drum (58). The regenerator overhead vapor (23) is air-cooled or any type of cooler in the secondary regenerator reflux cooler (57). The overhead STREAM (23) from the secondary regenerator (55) flows to the secondary overhead condenser (57) then STREAM (24) flows to the overhead K.O. drum (58) to separate the water. The gas stream (26) containing the rich $H_2S$ and hydrocarbons, and mercaptans flows to the first zone of the reaction furnace in the sulfur recovery unit or flows to the quench in the tail gas unit to recover the hydrocarbons.

The bottom of the secondary regenerator stream contains the rich solvent stream (27) that flows to the lean/rich heat exchanger (60) through the bottom pump (56) to heats up as stream (28) before entering the primary regenerator tower (61).

The $H_2S$ and gaseous components are stripped from the rich solvent solution by cascading the rich solution down through packed sections or trays, countercurrent to vapor produced by the reboiler. The reboiler could be indirect heat reboiler or fired heater reboiler. The steam flows to the reboiler on flow control. The lean solvent solution is collected on a chimney tray, which distributes the solution to the reboiler. As the lean solution passes through the reboiler, stripping steam is generated and flows up the column, while the lean solution is returned to the sump section in the base of the column as steam (29). This stripping steam provides agitation and the heat to release the absorbed $H_2S$ and $CO_2$ from the rich solvent solution, as it rises up through the column countercurrent to the rich solvent solution.

Before exiting the primary regeneration column, the stripped gases pass through the wash sections equipped by trays or packing where any entrained solvent solution are washed out with reflux stream (33) from the reflux drum (64). The regenerator overhead vapor stream (31) is air-cooled or any type of the cooler in the primary regenerator reflux overhead cooler (64). The cooler outlet temperature is controlled with variable speed drive on the air cooler fan motor if air cooler is used. The condensed vapor enters the primary Solvent Regenerator Reflux Drum (64) where the vapor/liquid mixture is separated.

The liquid stream is a sour water stream with dissolved $H_2S$ and $CO_2$. This stream is pumped with regenerator reflux pumps back to the column on flow control reset with level in the reflux drum (64). Fresh make-up water is added to the reflux line before entering the column. The make-up water rate is set to balance out the net water loss from the solvent system. The acid gas stream (32) from the reflux drum is sent to the second zone of the reaction furnace in the sulfur recovery unit.

The lean solvent from the primary regenerator stream (30) is cooled in the lean/rich exchanger (60). The cooled solvent then flows to the surge tank (67) then flows to the pump (68) and cooled in the cooler (69). The cooled solvent stream (35) goes to the secondary regenerator and the flash drum. If absorber operates at high pressure, the lean solvent is boosted by the booster pump (71) before entering the absorber. A slipstream of the solvent is filtered through the lean solvent filters (70) and then further cooled, if needed, in the lean solvent trim cooler. The cooled lean solvent is then sent back to the absorber(s), secondary regenerator and the scrubber on the top of the flash drum.

A minimum of 20% slip-stream is routed to the solvent carbon filter where surface-active contaminants and heat-stable salts (HSS) are removed through adsorption into the carbon active sites and solid impurities such as iron oxide, iron sulfide, pipe scale, dirt, and degradation products are removed from the solution. The outlet stream from filter is then sent to the solvent particulate filter. The downstream solvent particulate filter removes any carbon fines from the lean solvent. The operation of the carbon filter is important to controlling foaming and corrosion in the $H_2S$ removal unit. Samples of the solvent solution upstream and downstream of the carbon filter should be taken periodically, and the content of heat-stable salts should be determined and compared to previous samples. When the capacity of the carbon reaches saturation, inlet and outlet analyses will be indistinguishable. Before this occurs, the carbon should be replaced with a fresh charge of activated carbon.

The solvent sump collects solvent drains. The solvent collected in the sump may be returned to the solvent system if it is clean. Solvent is pumped out of the sump by the solvent sump pump, filtered by the solvent sump filter, and returned to the system in the solvent flash drum. Nitrogen blanketing prevents degradation of the solvent by oxygen.

The slop oil separated out from Solvent Flash Drum is sent to the Slops System. Slop oils separated out from the Regenerator bottom and from the Regenerator Overhead Drum are also periodically sent to drum via the rich solvent feed line.

The absorbers and primary and secondary regenerators are equipped with the wash section using packing or trays to reduce the solvent losses.

Figure 3:
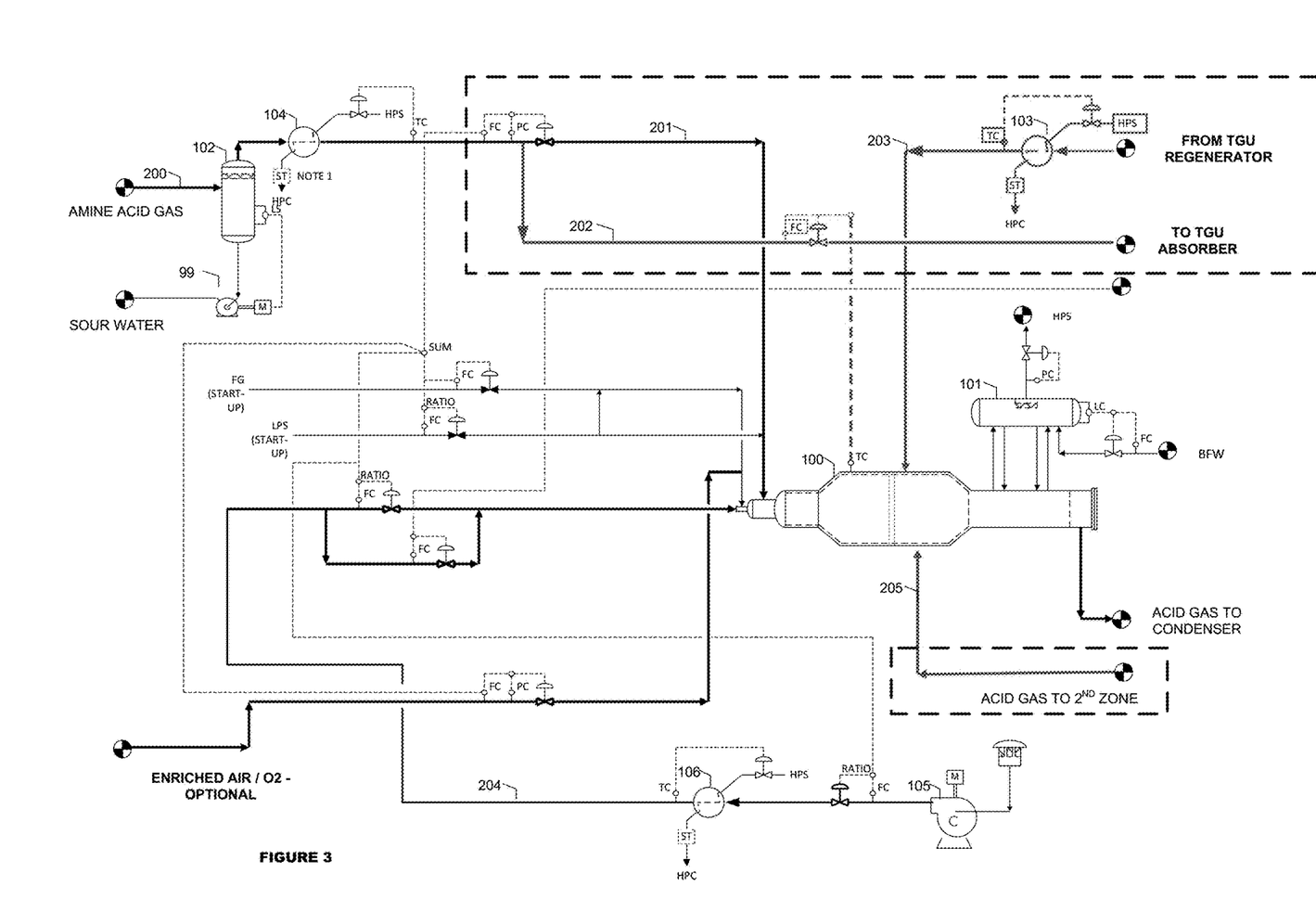
FIG. 3 illustrates a schematic diagram of an embodiment of the present disclosure, where the sulfur recovery consists of the 2-zone reaction furnace where the acid gas split to the first zone and to the tail gas absorber. The tail gas recycle is reheated and enters the second zone of the reaction furnace.

Turning to FIG. 3; The Amine acid gas from the amine unit stream 200 enters the sulfur recovery unit through the amine acid gas K.O. drum 102 where any entrained water is removed. The amine acid gas K.O. drum 102 has the capacity to handle large liquid slugs from operating upsets which may occur upstream to protect the Claus reaction furnace and downstream catalyst beds from sour water, hydrocarbon, or amine carryover. The amine acid gas K.O.

drum 102 has sour water pumps 99 that start at high liquid level and shut off at low liquid level, returning liquid to the sour water system.

The sulfur recovery unit is designed to have the reliability and the flexibility of different feed compositions, such as acid gas preheater 106, air preheater 104, and a unique 2-zone reaction furnace 100, to process up to 75% SRU feed stream 201, to the first zone of the reaction furnace 100, and to process the remaining up to 25% split acid gas as the tail gas recycle stream 203 (hydrocarbon free) in the second zone of the reaction furnace 100, through the tail gas recycle heater 103 where it was sent to the partial acid gas enrichment tail gas absorber 112. The additional stream from the upstream amine unit stream 205 hydrocarbon free is also added the second zone of the reaction furnace 100.

The enriched air or oxygen is shown on the FIG. 3 is optional and can be used only if required to boost the combustion temperature in the burner.

The acid gas is partially oxidized with air from the combustion air blower 105, in the first zone of the reaction furnace combustion chamber 100, according to the basic chemistry of the Claus process according to the Claus reaction. The combustion reaction as described by the Claus reaction equation is carried out in the burner of the reaction furnace 100. In the furnace portion of the reactor, the additional Claus reaction begins as a result of the high temperature. The combusted products from the first zone are mixed with the other stream from the amine and the tail gas recycle through the recycle steam repeater 103.

A combustion controller is provided to regulate the proper air input and acid gas mixture to the reaction furnace burner. The quantity of air required to produce a 2:1 H2S to SO2 ratio in the tail gas is controlled by summing the flow rate of the amine feed streams 201, 203 and 205 accordingly. This signal sets the flow controller on the main air stream.

A trim air flow controller receiving a signal from a tail gas analyzer located at the end of the Claus section automatically compensates for small changes in acid gas feed composition or errors in flow measurement within the range of the air control valve.

Sulfur is formed thermally in the reaction furnace 100 and the products from the exothermic reactions are cooled in the Waste Heat Boiler 101 by generating high pressure steam or medium pressure steam.

Figure 4:
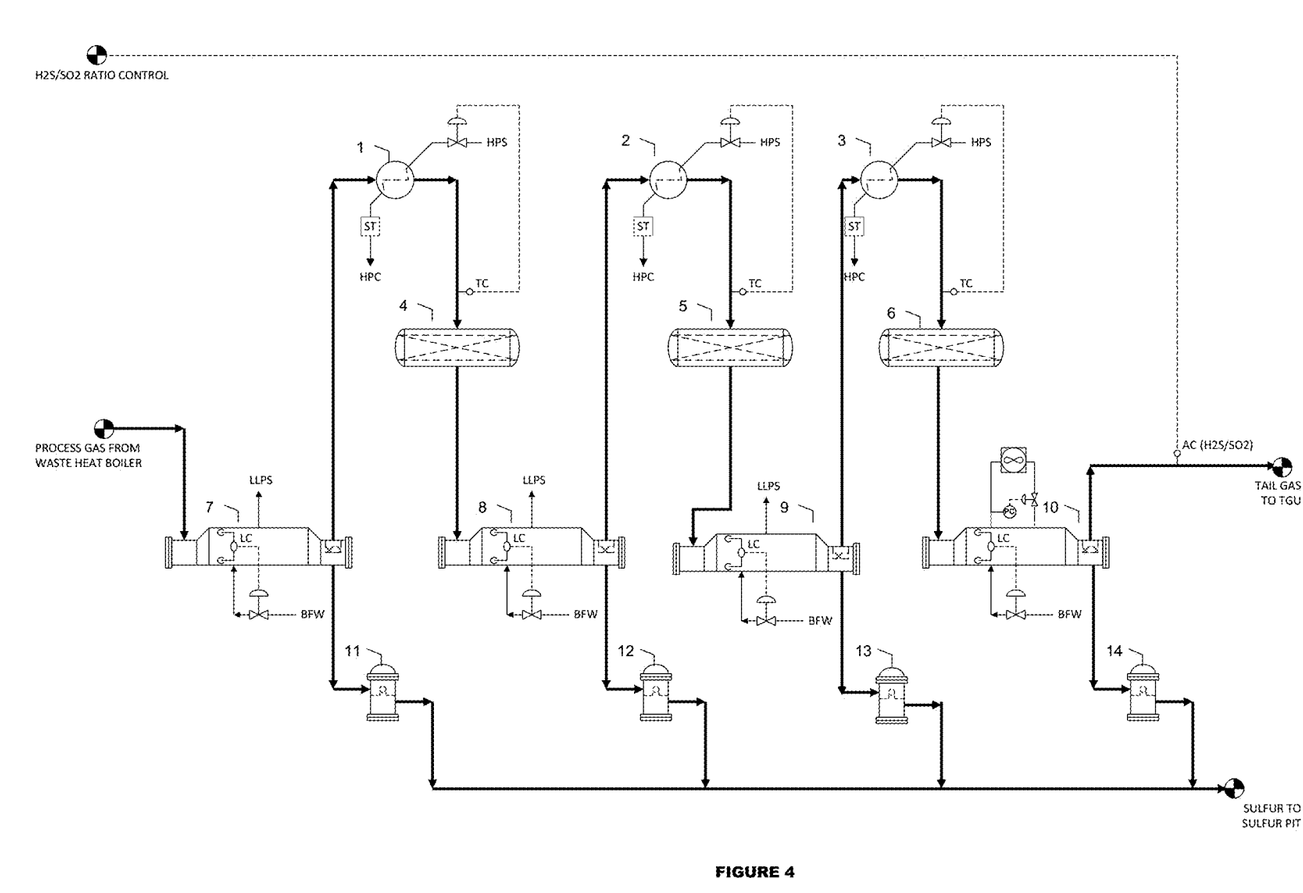
FIG. 4 illustrates a schematic diagram of an embodiment of the present disclosure, represents the catalytic stages of the sulfur recovery unit.

Turning to FIG. 4; the waste heat boiler outlet stream then further cooled in the No. 1 condenser which generates low pressure steam. The condensed sulfur is separated from the gas in a coalescer section that is integral with the condenser and fitted with a stainless steel wire mesh pad to minimize sulfur entrainment. The sulfur drains from the condenser through a sulfur seal and sample box to the sulfur pit. The sulfur pit is underground concrete or carbon steel vessel.

The catalytic stages converters 4, 5 and 6 could be conventional Claus, any sub dew point, or any direct oxidation or direct reduction catalysts converters based on defined catalysts that could be used.

The outlet gas from the No. 1 condenser 7; is heated indirectly in the No. 1 repeater 1; by high pressure steam and then enters the No. 1 converter 4; which contains Titanium and alumina catalysts. Sulfur is formed by an exothermic reaction, which creates a temperature rise across the catalyst bed. The converter effluent is then cooled in the No. 2 condenser 8; by generating low pressure steam and the condensed sulfur is drained to the sulfur pit.

Similarly, for the second or third or more stages converters 5 and 6 or others, the gas from the condenser 9 and 10 is reheated indirectly with steam in the reheater 2 and 3.

Basically, Sulfur is formed in each converter. The converter effluent is cooled in the associated condenser and the condensed sulfur is drained to the sulfur pit through sulfur seal, or sultrap or equivalent. The gas stream from the final condenser flows to the tail gas treating unit.

Figure 5:
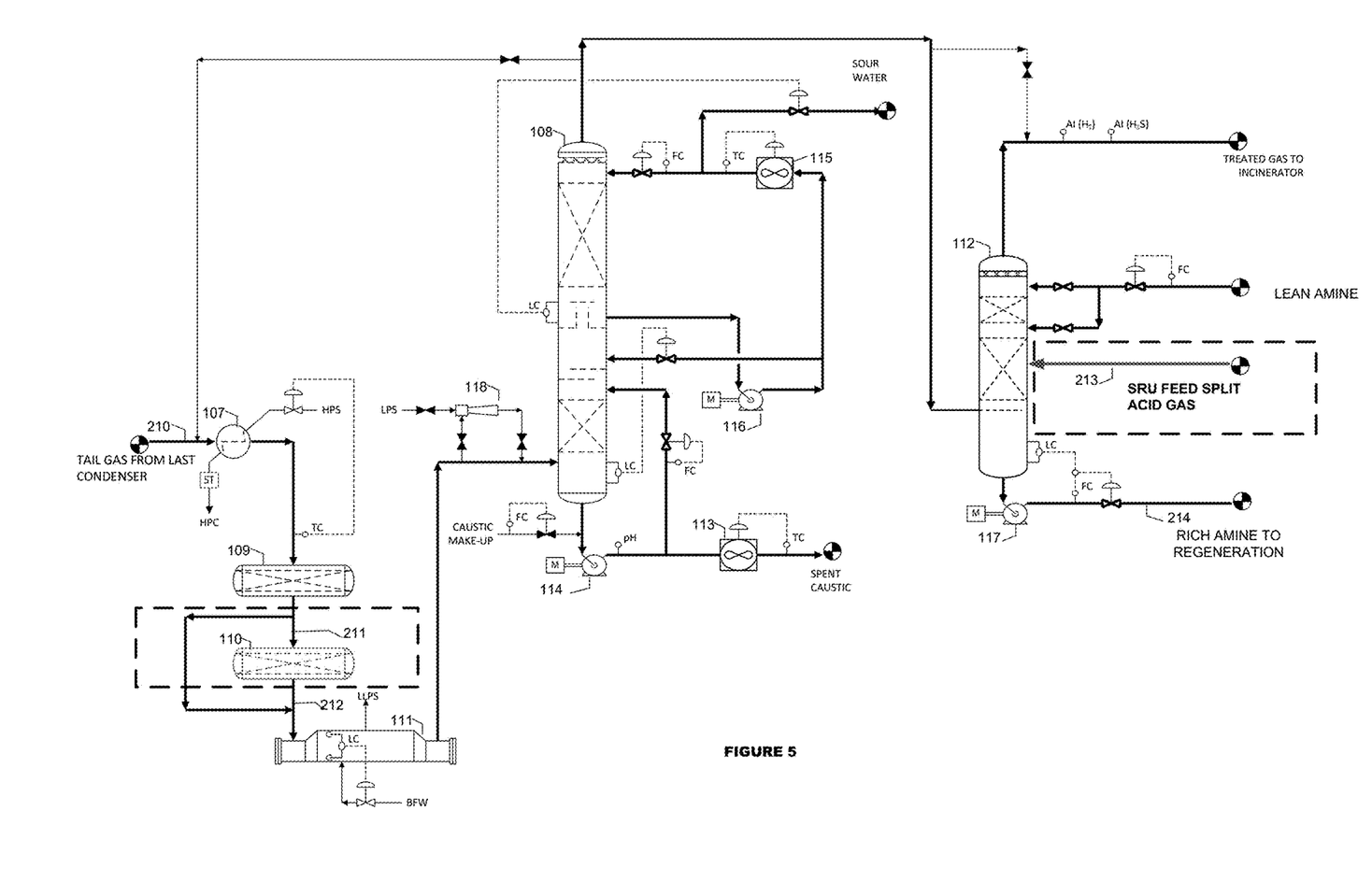
FIG. 5 illustrates a schematic diagram of an embodiment of the present disclosure, where the tail gas absorber receives the partial acid gas entering the sulfur recovery and will have partial enriched in the tail gas absorber as the partial acid gas enrichment absorber.

Turning to FIG. 5; the tail gas from the final condenser stream 210; of the sulfur recovery unit enters the hydrogenation section through the steam heater 107, or fired reheater. The steam heater, using high pressure steam, heats the tail gas up to a temperature that will permit the desired hydrogenation in the hydrogenation reactor, sulfur compounds are converted to H2S by the hydrogenation and hydrolysis reactions. The catalyst in the hydrogenation reactor is COMO catalyst in a form of conventional or in a form of low temperature COMO catalyst.

The tail gas heater type that is located before the hydrogenation reactor is fired heater type, inline burner, in direct heaters using High pressure steam, or multiple heaters using High pressure and superheated steam or using suitable heating media to achieve the adequate gas temperature before entering the hydrogenation reactor.

The tail gas absorber operates as the partial acid gas enrichment and receives 2 acid gas streams from the quench system overhead and slip stream of the amine acid gas that flows to the sulfur recovery unit.

The hydrogenation reactor consists of regular or low temperature hydrogenation catalyst as knows as COMO catalyst.

In the tail gas treating unit, the hydrolysis reactor which is located after the hydrogenation reactor contains the suitable Claus catalysts to achieve near 100% hydrolysis of COS, CS2 and any sulfur compounds, and the hydrogenation reactor consists of regular or low temperature hydrogenation catalyst as knows as COMO catalyst.

In this invention, an additional reactor is added as the hydrolysis reactor 110, which is after the hydrogenation reactor 109, in the tail gas unit; because overtime the tail gas hydrogenation catalyst loses efficiency and the COS & CS2 hydrolysis will decline resulting emission increase and would have impact on the unit performance, plus for such application the COS and CS2 are byproduct from the sulfur recovery which has impact on SO2 emission. Since the feed gas composition to the SRU is not rich in H2S, one of byproduct from the reaction furnace is COS. Even though, there is titanium catalyst in the first SRU reactor for COS/CS2 hydrolysis, the operating data shows significant COS in the tail gas stream in similar applications. It is known that the hydrogenation catalyst as known as CO-MO catalyst hydrolyze the COS but it shows significant COS from the hydrogenation reactor outlet, the operational data and the experience indicate, that COS could be in a range 30-40 ppmv at equilibrium condition. Therefore, the hydrolysis reactor is needed to assure that all of the sulfur specious will be hydrolyzed. The gas exiting the hydrolysis reactor 110; is cooled in the reactor effluent cooler 111, by producing low-pressure steam. The hydrolysis reactor 110; contains Claus type catalysts for high efficiency of hydrolysis of sulfur compounds.

The gas is further cooled, and water is condensed in the quench system 108. The quench system is a one or two-stage column in which the gas is first desuperheated by contact with a circulating water stream and then further cooled, and most of the water in the gas is condensed, by contact with a circulating stream of cooled water in a packed bed.

According to this invention, as shown in FIG. 5, a slip stream of the acid gas from the sulfur recovery flows to the tail gas absorber 112; as stream 213 to establish partial acid gas enrichment and very unique configuration as part of this scheme. In the amine treating section of the tail gas treating unit, the tail gas absorber has 2 functions operates as a tail gas absorber and operates as partial acid gas enrichment to enrich the H2S as process is called "Enrich SMAX".

H2S is absorbed from the tail gas absorber into an amine solution flowing to the top of the absorber 112. The treated tail gas is incinerated and released to the atmosphere.

The amine solution so called rich amine stream is pumped by the rich amine pump 117, from the bottom the tail gas absorber 112, and the pump discharge as the rich amine stream 214 flows to the tail gas regeneration system through lean/rich exchangers.

Figure 6:
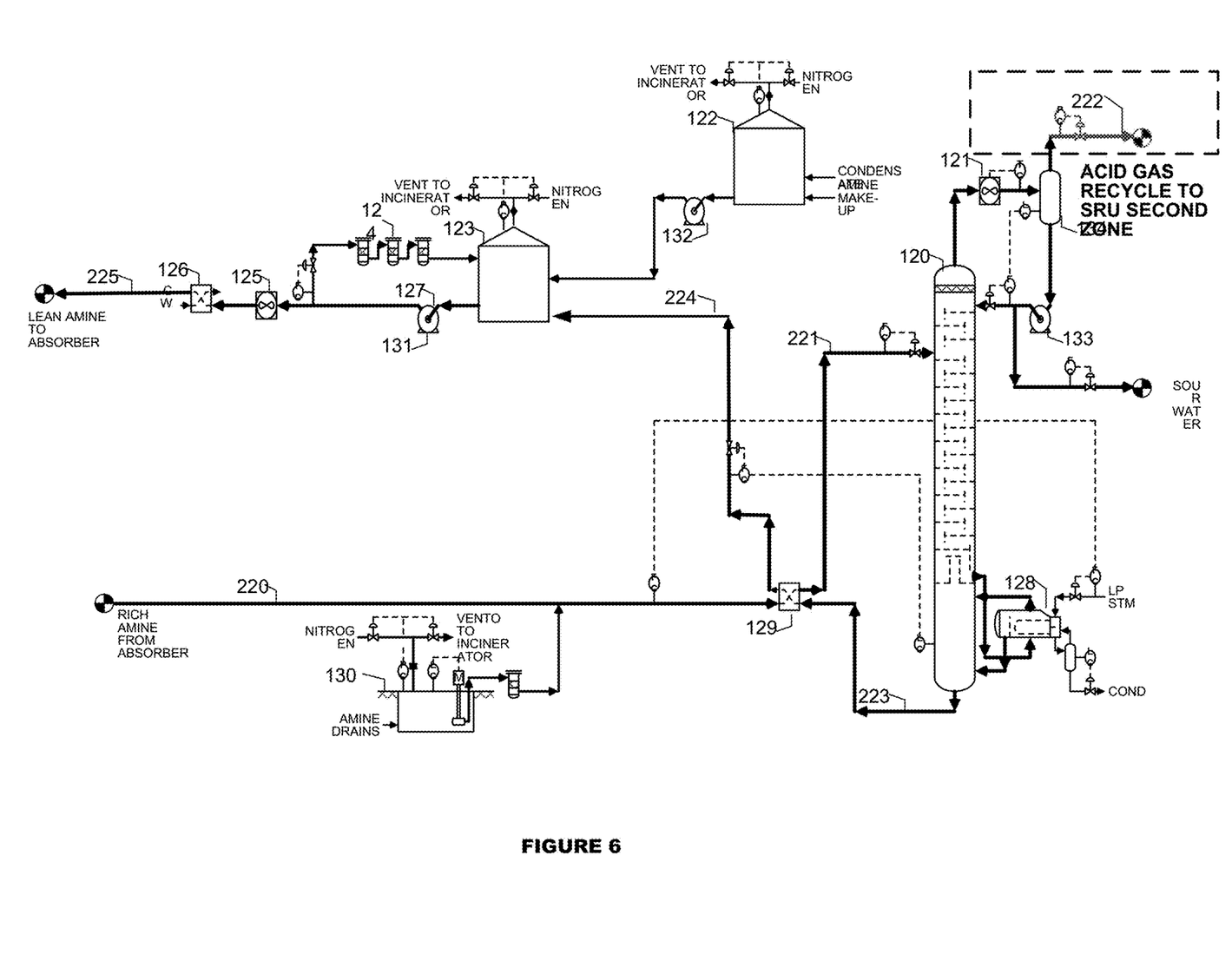
FIG. 6 illustrates a schematic diagram of an embodiment of the present disclosure, where the tail gas regeneration recovers the H2S and the overhead of the tail gas regeneration unit is recycled back to the second zone of the reaction furnace in the sulfur recovery unit.

Turning to FIG. 6, Rich amine is pumped by the rich amine pump from the bottom of the partial acid gas enrichment tail gas absorber to the regenerator. The amine from the amine sump is added to the rich amine stream. Rich amine is preheated in the lean/rich amine exchanger.

Stream 220 contains high H2S is heated in the exchanger 129, and stream 221 rich amine stream flows to the regenerator column 120. The regenerator column 120 recovers the H2S from the rich solution using tail gas reboiler 128, the rich gas with H2S is produced in the column is the enriched acid gas containing H2S, as stream 222, that is recycled to the second zone of the reaction furnace in the sulfur recovery through a steam repeater to sulfur recovery unit.

The typical amine type is MDEA based as the generic or formulated selective solvent for a higher selectivity of H2S absorption. MDEA-based amine solutions are used in tail gas units because they are selective for H2S over CO2 that is they absorb H2S more readily than CO2. Minimizing CO2 absorption is important for a tail gas unit because the acid gases that are absorbed are recycled to the sulfur plant. Without selectivity, the recycle of CO2 through the sulfur and tail gas units would continually build. The selectivity of MDEA for H2S over CO2 is kinetic, i.e. time dependent. H2S reacts more quickly with MDEA than CO2 so by limiting the contact time, H2S is preferentially absorbed. The lean amine solution fed the absorber contains a small amount of residual H2S and CO2 that could not be stripped from the solution in the regeneration section. The amount of residual acid gases in the amine feed to the absorber determines the concentration of the H2S that leaves the absorber in the overhead gas. So long as there is sufficient amine circulation, the H2S in the absorber overhead will approach equilibrium with the lean amine solution. CO2 does not approach equilibrium with the lean amine solution because of the kinetic limitation of the CO2-amine reaction. CO2 absorption is limited to about 15%.

Turning to FIG. 6; the regenerator column 120, consists of a lower stripping section and an upper condensing section. The stripping heat is provided by saturated low pressure steam through a regenerator reboiler 128. In the condensing section, the rising vapor is cooled by contact with air or water cooler. The quench water is pumped by the regenerator pump-around pump and cooled in the regenerator OVHD air cooler 121. The overhead gas from the tail gas regenerator 120 is recycled to the second zone of the reaction furnace in the Claus sulfur recovery unit.

Lean amine is pumped by the lean amine pump 131, and cooled in the lean/rich amine exchanger. The amine is further cooled in the lean amine air cooler and the lean amine water cooler 125 and 126, which uses cooling water as the cooling medium, and then fed to the tail gas and Enrich absorber 112, on flow control. A slip-stream of the amine is circulated through the filter system 124 (lean amine filter, amine carbon filter and amine particulate filter). The filter system removes solid impurities such as iron oxide, iron sulfide, pipe scale, dirt, hydrocarbons and degradation products from the solution. The filtered lean amine is sent to the amine surge tank.

A below-grade amine sump 130 collects amine drains and make-up amine. The amine collected in the sump may be returned to the amine system if it is clean. Amine is pumped out of the sump by the amine sump pump, filtered by the amine sump filter, and returned to the system at the suction of the rich amine pump. Nitrogen blanketing prevents degradation of the amine by oxygen.

According to this invention, wherein the tail gas unit is followed by the forced draft or natural draft thermal incineration with or without heat recovery or catalytic incineration.

According to this invention, wherein, the tail gas unit incineration can be equipped with the caustic scrubbing system or SETR type processes to achieve zero emission.

All of the compositions, methods, processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods, processes and/or apparatus and in the steps or sequence of steps of the methods described herein without departing from the concept and scope of the invention. Additionally, it will be apparent that certain agents which are both chemically and functionally related may be substituted for the agents described herein while the same or similar results would be achieved. All such similar substitutes or modifications apparent to those skilled in the art are deemed to be within the scope and concept of the invention. The disclosed and undisclosed embodiments are not intended to limit or restrict the scope or applicability of the invention conceived of by the Applicant, but rather, in conformity with the patent laws, Applicants intends to protect all such modifications and improvements to the full extent that such falls within the scope or range of equivalents.

We claim:

1. A process of integrated H2S removal, separation of impurities and partial acid gas enrichment in sour gas process wherein the process comprises:
   (a) contacting a sour gas stream comprising H2S with a lean solvent in at least one absorber to produce a treated gas stream and a rich solvent stream;
   (b) flowing the rich solvent stream to a flash drum and cooling the rich solvent stream from the flash drum, flowing the cooled rich solvent stream to a secondary regenerator to produce an enriched acid gas stream in the overhead of the secondary regenerator and a bottom stream comprising the rich solvent;
   (c) heating the bottom stream comprising the rich solvent from the secondary regenerator and flowing the heated bottom stream to a primary regenerator to produce an acid gas stream and a lean solvent stream, cooling the lean solvent stream prior to recycling the lean solvent to the at least one absorber in (a), the flash drum in (b), and the secondary regenerator in (b);
   (d) flowing up to 75% of the enriched acid gas stream from (b) to a first zone of a sulfur recovery 2-zone reaction furnace comprising a first zone and a second zone, flowing up to 25% of the remaining enriched acid gas stream from (b) to a tail gas absorber;
   (e) flowing at least a portion of the acid gas stream from (c) to the secondary regenerator as a hot acid gas slip stream and flowing the remainder of the acid gas stream from (c) to the second zone of the sulfur recovery 2-zone reaction furnace;

(f) thermally forming sulfur in the 2-zone reaction furnace through combustion of H2S and continuing the formation of sulfur after the 2-zone reaction furnace in a series of catalytic converters each comprising the steps of heating, catalytic reaction and cooling with condensation wherein a tail gas is generated from a final condenser in the series of catalytic converters;

(g) sending the tail gas to a tail gas treating unit comprising a hydrogenation reactor and a hydrolysis reactor downstream of the hydrogenation reactor wherein an effluent gas stream from the hydrolysis reactor is cooled and sent to the tail gas absorber.

2. The process of claim 1, wherein the at least one absorber, the primary regenerator, and the secondary regenerator of steps (a)-(c) are equipped with a wash section.

3. The process of claim 1, wherein the rich solvent stream in step (b) is heated prior to entering the flash drum.

4. The process of claim 1, wherein the rich solvent from the flash drum in step (b) is cooled off in any commercial cooler type prior to entering the secondary regenerator.

5. The process of claim 1, wherein the 2-zone reaction furnace uses air, enriched air or oxygen to achieve desired combustion temperature.

6. The process of claim 1, wherein an effluent of the 2-zone reaction furnace is cooled in a one or multiple pass waste heat boiler prior to continuing the formation of sulfur in the series of catalytic converters.

7. The process of claim 1, wherein the catalytic converters comprise a Claus catalyst.

8. The process of claim 1, wherein the 2-zone reaction furnace is divided with a choke ring, checker wall, or vector wall to separate each zone and establish separate reactions and combustions.

9. The process of claim 1, wherein the hydrogenation reactor consists of regular or low temperature hydrogenation catalyst.

10. The process of claim 1, wherein the tail gas is heated in a tail gas heater prior to entering the hydrogenation reactor; wherein the tail gas heater is a fired type heater, an inline burner, a direct heater, or multiple heaters using high pressure and superheated steam.

11. The process of claim 1, wherein in step (d), the enriched acid gas stream flows to a quench system prior to flowing to the tail gas absorber.

12. The process of claim 1, wherein the effluent gas stream from the hydrolysis reactor is cooled using a quench system.

13. The process of claim 1, wherein a treated gas is generated in the overhead of the tail gas absorber and sent to a forced draft or natural draft thermal incinerator with or without heat recovery or catalytic incineration.

14. The process of claim 13, wherein the thermal incinerator is equipped with a caustic scrubbing or SO2 adsorbent system.

15. The process of claim 1, wherein the at least one absorber of step (a) is operated at a pressure of 1 bar to 5000 bar.

16. The process of claim 1, wherein in the tail gas treating unit, the hydrolysis reactor contains a Claus catalyst to achieve hydrolysis of COS, CS2 and sulfur compounds.

17. The process of claim 1, wherein the secondary amine regenerator processes at least three feed streams; wherein the three feed streams comprise the cooled rich solvent of step (b), the cooled lean solvent of step (c), and the hot acid gas slip stream of step (e).

18. The process of claim 10, wherein the tail gas absorber operates as a partial acid gas enrichment and processes 2 acid gas streams; wherein the two acid gas streams comprise the enriched acid gas stream from the quench system and the up to 25% of the remaining enriched gas stream from the overhead of the secondary regenerator.

19. The process in claim 1, wherein any commercial cooler type is located between the hydrogenation reactor and hydrolysis reactor.

* * * * *